United States Patent [19]

Kouth

[11] 4,262,782

[45] Apr. 21, 1981

[54] DRIVE SYSTEM

[75] Inventor: Herbert Kouth, Schoneck, Fed. Rep. of Germany

[73] Assignee: Gofra Entwicklungsund Fertigungstechnik G.m.b.H., Rosbach, Fed. Rep. of Germany

[21] Appl. No.: 966,941

[22] Filed: Dec. 6, 1978

[30] Foreign Application Priority Data

Dec. 17, 1977 [DE] Fed. Rep. of Germany ....... 2756387

[51] Int. Cl.3 ............ F16D 67/00

[52] U.S. Cl. ............ 192/8 R

[58] Field of Search ............ 192/8 R, 8 A; 64/DIG. 2

[56] References Cited

U.S. PATENT DOCUMENTS

| | | | |
|---|---|---|---|
| 2,359,010 | 9/1944 | Smith | 192/8 R |
| 2,447,167 | 8/1948 | Davis et al. | 192/8 R |
| 2,573,939 | 11/1951 | Verville et al. | 192/8 R |
| 3,285,377 | 11/1966 | Rasmussen | 192/8 R |
| 3,835,967 | 9/1974 | Kerr | 192/8 R X |

*Primary Examiner*—Philip C. Kannan

*Attorney, Agent, or Firm*—Hane, Roberts, Spiecens & Cohen

[57] ABSTRACT

A drive system comprising a housing containing a two-element shaft for rotation, one element being a driving member and the other element being a driven member carrying a driver. The system is applicable for automobile window lifters, sliding roofs and the like. A coupling system rotatably connects the driving member and the driven member for transmitting rotational drive therebetween and a brake mechanism is associated with the drive shaft for applying braking force to prevent reverse drive from the driven member to the driving member. The brake mechanism comprises two circumferential jaw elements positioned in facing relation with one pair of opposite ends in abutment with one another and with the other pair of opposite ends serving as free ends in spaced relation. The free ends have radial actuation surfaces between which is positioned a freely movable release element. Actuation noses are formed on the driven element to pivot the release element about a radial axis so that the release element contacts the actuation surfaces and applies circumferentially directed forces thereto to cause the jaw elements to undergo radial displacement and engage the housing.

16 Claims, 4 Drawing Figures

DRIVE SYSTEM

FIELD OF THE INVENTION

The present invention relates to a drive system, particularly for automobile window lifters, sliding roofs and the like, having a drive shaft and a driver controlled by the drive shaft and acting directly or indirectly on an actuating member, and also having braking means.

PRIOR ART

Drive systems of the said type are known. The driver controlled by the drive shaft is, as a rule, a drive pinion which acts, for instance in the case of an arm lift, on a toothed segment, or in the case of a rope lift on the rope drum, or in the case of a cable lift on the threaded cable. It is common to all the drive systems used here that each of them has brake means by which the units which are to be controlled are prevented from shifting or moving by themselves when forces which enter the device other than from the drive shaft act on them.

These brake means are, as a rule, helically wound brake springs which are arranged within a housing and which apply the desired braking force by frictional engagement on the housing.

Such brake means, which are also known as drag-spring brakes can be produced only by maintaining very narrow tolerances if the desired braking forces are also to act accurately. The maintenance of these narrow tolerances results in a considerable complication in manufacture which it is the purpose of the present invention to avoid, in view of the cost involved therein.

SUMMARY OF THE INVENTION

In order to achieve the purpose of the invention it is proposed that the braking means have at least one freely movable release element which produces a braking force by swinging when the drive system is acted upon by a force from the driver. The release element is arranged essentially between a stator and a rotor, the rotor being the drive shaft. Upon the swinging of the release element the drive shaft is prevented from turning further, the brake force which enters into action even increasing with the load.

The axis of swing of the release element can, as a further development of the invention, be parallel, perpendicular, oblique or askew to the axis of the drive shaft.

Other embodiments and suitable further developments of the invention can be noted from the following description and the claims, read in conjunction with the drawing.

BRIEF DESCRIPTION OF THE DRAWING

The invention will be described hereinbelow with reference to an illustrative embodiment shown in the drawing, in which.

DETAILED DESCRIPTION

Figure 1:
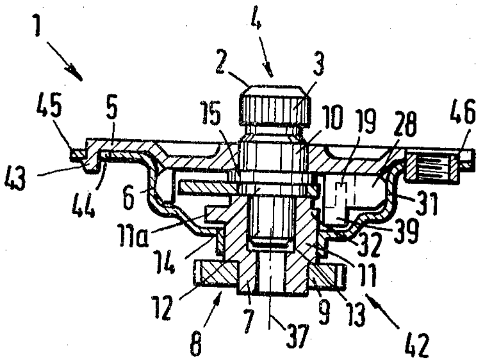
FIG. 1 is a section taken along line I—I in FIG. 4 through a drive system in accordance with the invention.

A drive system 1 comprises a drive shaft 4 having, for instance at its one end 2, a serration 3, the drive shaft being supported in a bearing cap 5 and a housing 6, and having at its output end 7 a driver 8, for instance in the form of a pinion 9. In the embodiment shown, the drive shaft 4 is in two parts and consists of a driving shaft piece 10 and a driven part 11 which is in the form of a sleeve. The housing-side end 12 of the shaft piece 10 is mounted for free rotation in a borehole 13 of the driven part 11 and is secured against axial displacement by abutment of a shoulder 14 against an end surface of the driven part 11 in one direction and by abutment of a collar 15 against the bearing cap 5 in the other direction. A flange 11*a* which rests on the housing 6 furthermore secures the driven part, and thus also the drive shaft 4, against axial displacement in the direction towards the pinion 9.

A driver in the form of a sector-shaped disk 18 having two radially directed drive surfaces 16 and 17 is fastened, fixed for rotation, on the shaft piece 10. From the driven part 11 two noses 19 and 20 with stop surfaces 21 and 22 extend axially up to in front of the drive surfaces 16, 17 or else overlap them in axial direction. In this way assurance is had that the driven part 11 and thus the pinion 9 are also turned upon the rotation of the shaft piece 10.

Figure 4:
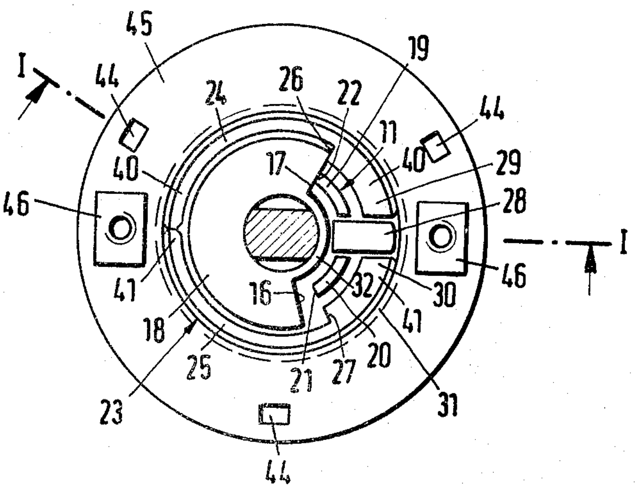
FIG. 4 is a top view of the drive system of FIG. 1 after removal of the bearing cap.

When the driver surface 17 of the sector-shaped disk 18 comes against the facing stop surface 22 of the nose 19, its driving surface 16 is at a slight distance from the stop surface 21 of the nose 20 corresponding to it, as shown in FIG. 4. The shaft piece 10 and the driven part 11 are thereby connected firmly for rotation with each other with some play in the direction of rotation.

Finally, at the height of the sector-shaped disk 18 as well as radially outside thereof there is provided at least one brake body 23 which preferably consists of two halves or brake jaws 24, 25 which have stop surfaces 26, 27 which are aligned radially with the stop surfaces 21, 22 of the driven part 11. The stop surfaces 26, 27 extend radially outward from the inner periphery of the brake jaws 24, 25.

When the driver surfaces 16, 17 of the sector-shaped disk 18 rest against the stop surfaces 21, 22 of the noses 19, 20, there also takes place, at the same time, a striking against the stop surfaces 26, 27 of the brake jaws 24 and 25. This means that upon rotation in clockwise or in counterclockwise direction of the sector-shaped piece 18 driven by the shaft piece 10, the driven part 11 and one brake jaw 24, 25 are directly driven or rotated in all cases by application against the nose 19 or 20 respectively.

A release element 28 is provided between the noses 19, 20 of the driven part 11 and the facing free ends 29, 30 of the brake jaws 24, 25 on the one hand and between an axially extending housing part 31 and a piece 32 of the outer contour of the driven part 11 on the other hand. The release element 28 is preferably of L shape and is limited with some play in the axial direction by the bearing cap 5 and two radially directed housing parts 33 and 34 which are axially staggered with respect to each other.

The housing 6 is a round hollow body whose housing part 31, developed as a curved or cylindrical limiting wall, forms that brake surface against which the brake jaws 24, 25 act. The housing parts 33, 34 are limiting walls having annular limiting surfaces.

Figure 2:
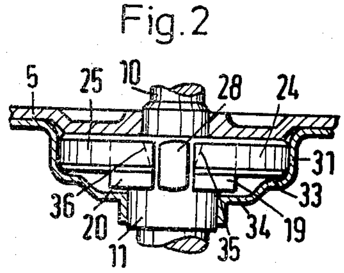
FIG. 2 is a partial section through the drive arrangement of FIG. 1, but at an angle 90° thereto.
Figure 3:
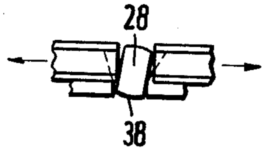
FIG. 3 shows a detail of FIG. 2 in braking condition.

The facing surfaces 35, 36 of the noses 19, 20 are at an acute angle to each other, as can be noted in particular from FIG. 2. The surfaces 35, 36 which converge from the shaft piece 10 towards the pinion 9 therefore permit the release element 28 to tilt around an axis which is perpendicular to the axis 37 of the drive shaft 4 or around its lower base point 38, shown in FIG. 3. If such a tilting or canting of the release element 28 takes place in operation, the brake jaws 24 and 25 are thereby pressed against the cylindrical limiting wall 31 of the housing 6, producing a braking and holding force.

On the other hand, the release element 28 can, however, also tilt around an axis which is parallel to the axis 37 of the drive shaft 4 or is oblique or askew to the axis 37. However, that axis of tilt or swing which is perpendicular to the axis of rotation 37 of the drive shaft 4 is of the greatest importance.

Upon tilting around the pivot axis which is perpendicular to the axis of rotation 37, the release element 28 swings around lower edge 38 at the free end of arm 39 at a slight distance above the radially directed housing wall 34. The surface of the release element 28 is preferably flat or is slightly arched in such a manner that the swinging process is facilitated thereby (see FIG. 3).

If the drive system 1 is driven from the shaft piece 10 provided with the serration 3, then the sector-shaped disk 18 acts, via the noses 19, 20, turn the driven piece 11.

Furthermore, the sector-shaped disk 18, by the application of one of its drive surfaces 16, 17 against one of the stop surfaces 26 or 27, also pushes the brake jaws 24, 25 synchronously with it, and the release element present between the noses 19, 20 and the free ends 29, 30 of the brake jaws 24, 25 is displaced in the direction of rotation by the noses and the free ends of the brake jaws.

If a drive acts from the side of the pinion 9 or if a torque acts on the pinion 9, a rotation is thereby produced on the drive part 11 which has the noses 19, 20. Depending on the direction of rotation, one or the other nose 19 or 20 strikes the release element 28. The nose 19 or 20 acts eccentrically on the release element 28 and, furthermore, the surfaces 35, 36 which act on the release element 28 are canted at an angle to the surfaces of said release element so that the release element 28 is swung or canted. By this canting there is produced a braking force which, in the case of the embodiment shown by way of example, is transmitted to the brake jaws 24, 25 and presses them radially outward against the cylindrical housing part 31. The actual holding effect is obtained thereby in the region of the holding jaws 24, 25.

Finally, it is clear that the free ends 29, 30 of the brake jaws 24, 25 are so developed that they permit a tilting of the release element 28, i.e. there must be at least sufficient clearance between the release element 28 and the two free ends 29, 30 for swinging or canting to be possible at any time.

The two other, free ends 40, 41 of the brake jaws 24, 25 preferably lie directly against each other and are, for instance, slightly rounded.

The drive shaft 4 with the sector-shaped disk 18, the supporting ring 23, and the release element 28 form the drive system 1 with an integrated braking means 42, the most important part of which is the release element 28. All parts are arranged in the housing 6 which is closed by the bearing cap 5 and has annular stops, tapering towards the pinion 9, in order to form the housing part 33, 34 or else in order to form supporting surfaces.

For the fastening of the bearing cap 5 to the housing 6 there are employed a plurality of hooks 43 which are arranged on the bearing cap 5 and engage behind the edge of openings 44 in a housing flange 45. The bearing cap 5 can be a plastic part.

The fastening of the driving and braking means to the parts supporting them can be effected by any desired fastening means but is preferably effected by means of stamped nuts 46 which are also arranged in the flange 45 of the housing 6.

The drive system of the invention is not limited to use in automobile construction but it can also be employed in other fields. This possibility is present, in particular, also because the active clearance between clockwise rotation and counterclockwise rotation of the drive shaft is extremely small or precisely adjustable and because furthermore a torque acting on the driven part 11 is not transmitted at all to the driving shaft piece of the drive shaft. Before a transmission of force could become active, the braking means engages and thereby secures the driving shaft piece against load.

In the illustrative embodiment shown, while the release element produces the braking force, it does not itself act as a brake body. With suitable dimensioning of the parts receiving the release element, the release element can also be directly employed as a brake body if, upon swinging, it cants between the limiting walls which receive it. In this event the brake jaws would, in the case of an approximately similar embodiment, have the function of a driver.

The invention is not limited to the embodiment described but changes can be effected without going beyond the basic concept of the invention as defined in the appended claims.

I claim:

1. A drive system comprising a housing, a two-element drive shaft rotatably supported in said housing, a first element of said drive shaft including a driving member and the second element of said drive shaft including a driven member and a driver on said driven element, coupling means for rotatably coupling said driving member and said driven member for transmitting rotational drive therebetween, and brake means associated with said drive shaft for applying braking force to prevent reverse drive from said driven member to said driving member, said brake means comprising at least one circumferential brake jaw positioned in spaced, facing relation with said housing and having a free end with a radial actuation surface, a freely movable release element positioned adjacent said actuation surface in spaced relation therewith, said coupling means including an element facing said release element to pivot the same about a radial axis passing through said release element to cause said release element to contact said actuation surface with a circumferentially directed force, said brake jaw being constructed to undergo radial displacement and engage said housing upon application of said circumferentially directed force.

2. A drive system as claimed in claim 1 wherein said release element is of L-shape.

3. A drive system as claimed in claim 1 wherein said coupling means couples said driving and driven members in rotation with play.

4. A drive system as claimed in claim 1 wherein said brake jaw comprises an annular ring with two said free ends in spaced relation, said release element being disposed between said free ends such that when the release element is pivotably moved it contacts said free ends concurrently to spread the ring apart and press the same against said housing.

5. A drive system as claimed in claim 4 wherein said release element is also pivotable about an axis parallel to the axis of the drive shaft.

6. A drive system as claimed in claim 4 wherein said annular ring comprises two part-annular elements in abutment with one another at the ends thereof remote from said free ends which are in spaced relation.

7. A drive system as claimed in claim 6 wherein said driven member comprises a sleeve, said driving member including a shaft rotatably supported in said sleeve.

8. A drive system as claimed in claim 7 wherein said driven member comprises two axially extending stop elements with respective stop surfaces and said shaft includes two driver surfaces which axially overlap said stop surfaces and are spaced therefrom with play in the circumferential direction.

9. A drive system as claimed in claim 8 wherein said stop elements are noses on said driven member and said driver surfaces are on a sector-shaped disk which is secured in rotation with said shaft.

10. A drive system as claimed in claim 9 wherein said release element is arranged between said noses as well as between said free ends of the part-annular elements of said brake jaw.

11. A drive system as claimed in claim 10 wherein said surfaces of the noses which face each other and the release element therebetween are at an acute angle to each other to accommodate the pivotal movement of the release element.

12. A drive system as claimed in claim 11 wherein said noses are positioned to act eccentrically on said release element to pivot the same about said radial axis.

13. A drive system as claimed in claim 12 wherein said noses and said part-annular elements are concentrically arranged around said drive shaft and contact said release element at different radial positions.

14. A drive system as claimed in claim 12 wherein said part-annular elements of said brake jaw have stop surfaces which are radially aligned with said stop surfaces of said noses.

15. A drive system as claimed in claim 14 wherein said housing is a round hollow body.

16. A drive system as claimed in claim 15 wherein said housing has annular shoulders which serve as supporting surfaces for said driving and driven members and driven members and said coupling means.

* * * * *